Sept. 21, 1965  J. A. BODET  3,206,908
METHODS OF PRODUCING RECEPTACLES FILLED WITH A SUBSTANCE
Original Filed Sept. 8, 1961  3 Sheets-Sheet 1
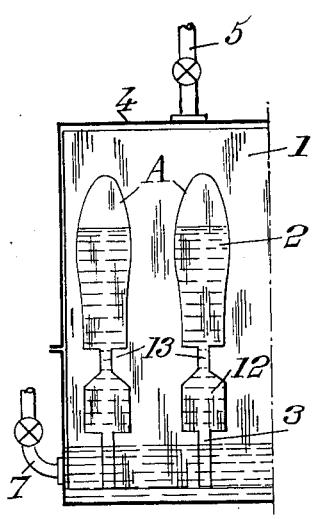
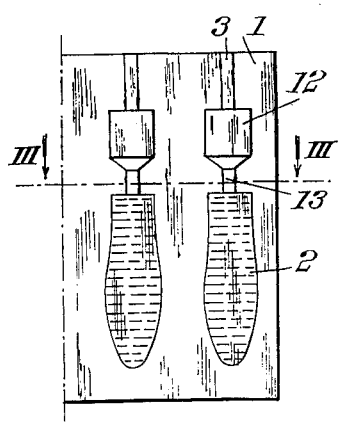
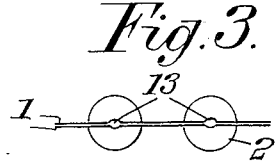
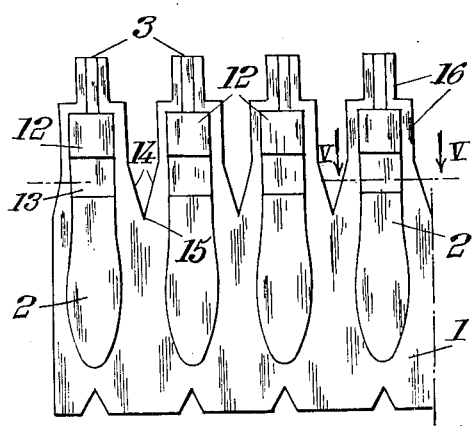
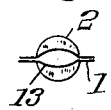

Sept. 21, 1965  J. A. BODET  3,206,908
METHODS OF PRODUCING RECEPTACLES FILLED WITH A SUBSTANCE
Original Filed Sept. 8, 1961  3 Sheets-Sheet 2
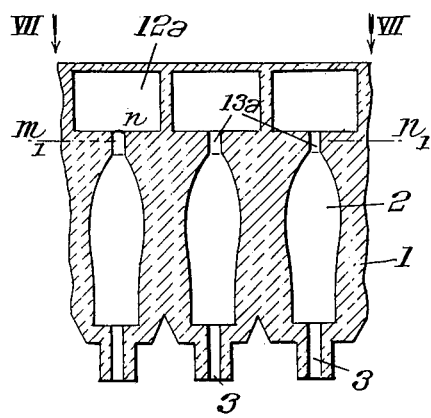
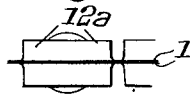
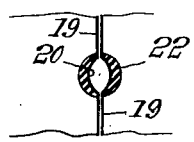
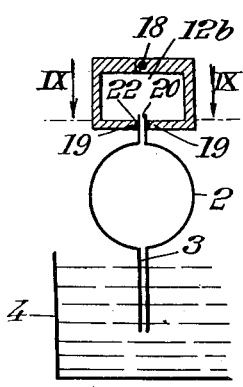
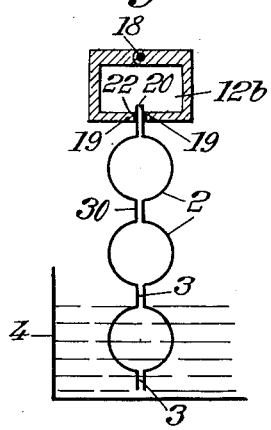

Sept. 21, 1965     J. A. BODET     3,206,908
METHODS OF PRODUCING RECEPTACLES FILLED WITH A SUBSTANCE
Original Filed Sept. 8, 1961     3 Sheets-Sheet 3
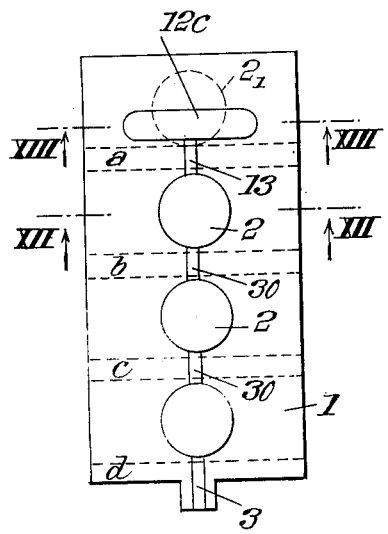
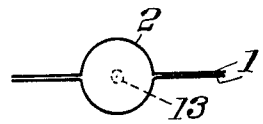
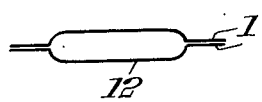
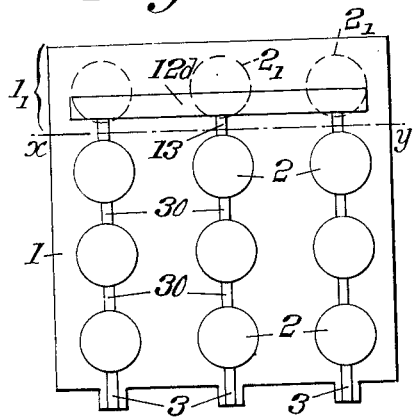
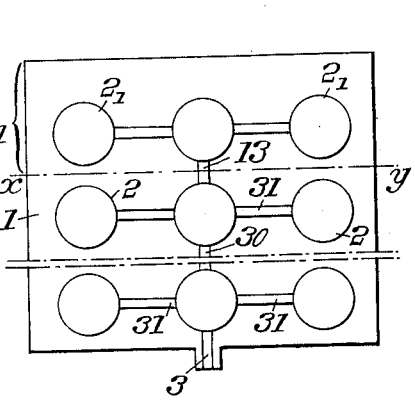

United States Patent Office 3,206,908
Patented Sept. 21, 1965

3,206,908
METHODS OF PRODUCING RECEPTACLES FILLED WITH A SUBSTANCE
Jean Augustin Bodet, 42 Ave. du Marechal Douglas Haig, Versailles, France
Continuation of application Ser. No. 136,782, Sept. 8, 1961. This application Apr. 1, 1964, Ser. No. 356,542
Claims priority, application France, Oct. 13, 1960, 841,094; Jan. 3, 1961, 848,646
3 Claims. (Cl. 53—37)

The present application is a continuation of my prior United States patent application Ser. No. 136,782, filed September 8, 1961, now abandoned, for "Improved Processes for the Production of Vacuum Filled Receptacles."

The present invention relates to methods of producing receptacles filled with a substance.

The object of my invention is to produce a strip of a flexible packing material forming at least one airtight container pocket entirely filled with the substance to be packed.

For this purpose, according to the present invention, I start from a structure forming at least two pockets of bulging shape and communicating together, at least one of said pockets, intended to form the container pocket, being made of said packing material and the other pocket being an auxiliary pocket, said structure further forming a conduit starting from one of said pockets and forming the only communication between the inside of said two pockets and the outside. I place this structure, with said conduit extending downwardly, in an airtight chamber. I form a vacuum in said chamber, whereby air flows out therefrom, including the air present in said pockets. I introduce the above mentioned substance, in the liquid state, into said chamber up to a level above the open end of said conduit. Then I place the portion of said chamber above the level of said liquid into communication with the atmosphere, whereby said liquid substance is forced into at least the lowest of said pockets and I stop the communication between said two pockets.

Preferred embodiments of my invention will be hereinafter described, with reference to the accompanying drawings, given merely by way of example, and in which:

FIG. 1 shows, in section, a vacuum chamber during the filling of a plurality of container pockets;

FIG. 2 shows the pockets of FIG. 1 turned upside down in order to complete the filling operation;

FIG. 3 is a section on an enlarged scale on the line III—III of FIG. 2;

FIGS. 4 and 5 show, respectively in plan view and in section on the line V—V of FIG. 4, a strip of suppositories prepared in accordance with a modification of the invention;

FIG. 6 is a sectional view of a strip of packing for suppositories made according to another embodiment of the invention;

FIG. 7 is a top view of the structure of FIG. 6;

FIG. 8 is a vertical sectional view illustrating a further modification of the invention;

FIG. 9 is a sectional view, on an enlarged scale, on the line IX—IX of FIG. 8;

FIG. 10 is a vertical sectional view illustrating still another modification of the invention;

FIG. 11 is a side view illustrating still another modification of the invention;

FIG. 12 is a sectional view on the line XII—XII of FIG. 11;

FIG. 13 is a sectional view on the line XIII—XIII of FIG. 11;

FIGS. 14 and 15 are views illustrating two other modifications of the invention, respectively.

Referring to FIG. 1 of the drawings, a strip 1 is made of two juxtaposed sheets of air impervious thermoplastic flexible material, such for instance, as vinyl chloride, shaped to form, between them, pockets 2 intended to contain the material to be packed. If the volume of said pockets ranges from 10 to 15 cubic centimeters, each sheet of unplastified vinyl chloride has a thickness of about 150 microns, so that by glueing of said sheet with the other sheet, the resulting strip is capable of maintaining its shape. Pockets 2 communicate, at their lower ends, through ducts 13, with auxiliary pockets 12 also formed in the juxtaposed sheets and provided with inlet ducts 3 opening to the outside.

Strip 1 is mounted vertically in a vacuum chamber 4 from which air can be evacuated through conduit 5 and to which liquid can be admitted through conduit 7.

Air is evacuated through conduit 5, so that a vacuum is formed in vessel 4, both on the inside and on the outside of pockets 2 and 12, whereby said pockets have no tendency to flatten. Then the liquid to be packed in pockets 2 is introduced through conduit 7 to a level well above the inlets of ducts 3. Conduit 5 is then opened to the atmosphere so that the atmospheric pressure forces the liquid into pockets 12 and 2.

It should be well understood that it is impossible to apply a very high vacuum as, otherwise, the liquid in the bottom of chamber 4 would boil. Account should also be taken of the fact that this liquid is frequently heated to render it more fluid so that boiling will occur for relatively low vacuums. Therefore, in practice relatively large spaces A filled with air are left at the tops of pockets 2.

Strip 1 is then turned upside down into the position illustrated by FIG. 2. The liquid present in auxiliary pockets 12 flows down into pockets 2, whereas the residual air in spaces A escapes upwardly in the form of bubbles toward auxiliary pockets 12.

Once this operation has been effected, it only remains to seal the pockets by closing the small intermediate ducts 13, for instance by flattening and hot welding said ducts 13. In order to facilitate this operation, these ducts 13 are given a flattened section as shown by FIG. 3. Strip 1 is then cut along the line III—III of FIG. 2 so as to remove the portion containing chambers 12.

FIGS. 4 and 5 illustrate a preferred form of packing wherein strip 1 is notched at 14–15 to facilitate separation of pockets 2 from one another.

Furthermore, in this embodiment of the invention, the portions 16 of strip 1 that are immersed in the liquid for filling have a smaller surface area, and the ducts 13 of FIG. 4 are larger but also flatter than those shown in FIG. 2.

In the embodiment of the invention illustrated by FIGS. 6 and 7, auxiliary pockets 12a, instead of being located on the same side of pockets 2 as filling ducts 3 are located on the opposite side. In this case, strip 1 is left in its initial position after the filling operation and the residual air is expelled into chambers 12a, where it remains. Ducts 3 and 13 are closed, for example by flattening and welding in the hot state.

The portion of strip 1 comprising pockets 2 can be separated from the portion comprising pockets 12a, after the filling operation, by cutting said strip along line $m_1$—$n_2$ (FIG. 6), after ducts 13 have been closed.

It should be well understood that the invention may be used for obtaining pockets of plastic material filled with any substance.

It may be of interest to make use of auxiliary pockets 12b independent of the pockets to be filled. As shown by FIGS. 8 and 9, the auxiliary pockets 12b may be in the form of boxes each comprising two jaw elements hinged together about a pivot 18 so as to be able to close in a fluidtight manner at 19 on a duct 20 integral and communicating with the pocket 2 to be filled. Fluidtightness is ensured by a packing 22 interposed between jaw elements 19 and duct 20 (FIG. 10).

FIG. 10 shows an arrangement of the same kind but where there are several pockets 3 connected in series.

The invention may be used with various packing strips some examples of which are given by FIGS. 11 to 15, comprising pockets 2, of any desired shape (spherical, polyhedral, etc.), which are connected together by ducts 30 and 31.

The same packing strip 1 may comprise a plurality of pockets 2 in series and connected together by ducts 30 (FIG. 11), of a plurality of series of such pockets 2 (FIG. 14). These series of pockets 2 may also be connected in parallel by transverse ducts 31, as shown by FIG. 15.

With the arrangements of FIGS. 11 to 15 the auxiliary pocket, or pockets, in which residual air gathers is formed in strip 1 and connected by a duct 13, or several ducts 13, to the series of pockets 2.

If there are several series of pockets 2, as shown by FIG. 14, a single auxiliary pocket 12d may be connected through different ducts 13 to the respective series of pockets 2.

However, auxiliary chamber 12c (FIG. 11) or 12d (FIG. 14) may be replaced by a pocket or pockets $2_1$ similar in shape to pockets 2, as shown in dotted lines in FIGS. 11 and 14. In other words, in the case of a plurality of pockets 2 in series, through which the liquid flows successively during the filling operation, the last pocket $2_1$, in which the residual air collects, acts as an auxiliary cavity.

Of course, I may also make use of a strip as shown by FIG. 15 similar to that of FIG. 14 but where all the pockets 2 of a horizontal row are connected together through ducts 31 and only one vertical series of pockets 2 is provided with ducts 30 for connecting the respective rows with one another, with a duct 13 for connecting said rows with the row of pockets $2_1$ and with an inlet duct 3.

The invention is particularly useful in the case of a multiplicity of pockets to be filled in series and when it is not possible to make use of a highly developed vacuum as, for example, with substances which are heated before being supplied to the receptacles and which solidify or become extremely viscous upon cooling of the filled chambers.

What I claim is:

1. A method of producing a receptacle filled exclusively with a substance, which method comprises starting from a structure forming a recess comprising at least two pockets of bulging shape and communicating together through a duct, with a conduit starting from one of said pockets forming the only communication between the inside of said pockets and the outside, placing said structure, with said conduit extending downwardly, in an airtight chamber, forming a partial vacuum in said chamber, whereby air flows out therefrom while leaving residual air in said pockets, introducing said substance in the liquid state into said chamber up to a level above the open end of said conduit, filling up one of said pockets with said liquid while accumulating the residual air into the other one, said last mentioned operation comprising the step of placing the portion of said chamber above the level of said liquid substance into communication with the atmosphere, stopping said duct, and removing the pocket wherein said residual air has accumulated.

2. A method of producing a receptacle filled exclusively with a substance, which method comprises starting from a flexible material structure forming at least two thin walled pockets of bulging shape and communicating together through a duct, one of said pockets being a container pocket and the other an auxiliary pocket, with a conduit starting from said auxiliary pocket forming the only communication between the inside of said pockets and the outside, placing said structure in an airtight chamber, with said auxiliary pocket under said container pocket and said conduit extending downwardly, forming a partial vacuum in said chamber, whereby air is evacuated therefrom while leaving residual air in said pockets, introducing said substance in the liquid state into said chamber up to a level above the open end of said conduit, opening the top of said chamber to the atmosphere to drive, by means of the atmosphere pressure, said liquid into said two pockets to fill up the lower one and to trap the residual air into the top of the upper one, turning said structure upside down while preventing outflow of liquid from said pockets, whereby said liquid substance fills up said container pocket whereas all the air precedingly entrapped in said container pocket passes into said auxiliary pocket, stopping said duct and severing said auxiliary pocket from said container pocket.

3. A method of producing a receptacle filled exclusively with a substance, which method comprises starting from a flexible material structure forming at least two pockets of bulging shape and communicating together through a duct, one of said pockets being a thin-walled container pocket and the other an auxiliary pocket, with a conduit starting from said container pocket forming the only communication between the inside of said pockets and the outside, placing said structure in an airtight chamber, with said container pocket under said auxiliary pocket and said conduit extending downwardly, forming a partial vacuum in said chamber, whereby air is evacuated therefrom while leaving residual air in said pockets, introducing said substance in the liquid state into said chamber up to a level above the open end of said conduit, opening the top of said chamber to the atmosphere to drive, by means of the atmospheric pressure, said liquid into said lower container pocket and to trap the residual air into the upper auxiliary one, whereby said liquid substance fills up said container pocket whereas all the air is entrapped in said auxiliary pocket, stopping said duct and separating said auxiliary pocket from said container pocket.

References Cited by the Examiner

UNITED STATES PATENTS

| 1,259,879 | 3/18 | Lascoff | 53—22 |
| 1,922,458 | 8/33 | Schaeffer | 53—37 X |
| 1,925,502 | 9/33 | Schaeffer | 53—37 X |
| 2,544,416 | 3/51 | Emery et al. | |

FRANK E. BAILEY, *Primary Examiner.*

TRAVIS S. McGEHEE, *Examiner.*